United States Patent
Truong et al.

(10) Patent No.: US 9,304,702 B2
(45) Date of Patent: Apr. 5, 2016

(54) SYSTEM AND METHOD FOR PARALLELIZED PERFORMANCE DATA COLLECTION IN A COMPUTING SYSTEM

(71) Applicant: NetApp, Inc., Sunnyvale, CA (US)

(72) Inventors: Dan Truong, Sunnyvale, CA (US); Alexander Sideropoulos, Sunnyvale, CA (US); Michael Cao, Sunnyvale, CA (US); Raymond Luk, Sunnyvale, CA (US)

(73) Assignee: NETAPP, INC., Sunnnyvale, CA (US)

( * ) Notice: Subject to any disclaimer, the term of this patent is extended or adjusted under 35 U.S.C. 154(b) by 145 days.

(21) Appl. No.: 14/290,313

(22) Filed: May 29, 2014

(65) Prior Publication Data
US 2015/0347055 A1  Dec. 3, 2015

(51) Int. Cl.
*G06F 3/06* (2006.01)
*G06F 11/34* (2006.01)

(52) U.S. Cl.
CPC .............. *G06F 3/0626* (2013.01); *G06F 3/067* (2013.01); *G06F 3/0613* (2013.01); *G06F 3/0653* (2013.01); *G06F 3/0659* (2013.01); *G06F 11/3404* (2013.01)

(58) Field of Classification Search
CPC ..... G06F 3/0626; G06F 3/067; G06F 3/0659; G06F 3/0653; G06F 3/0613; G06F 11/31; G06F 11/3404; G06F 11/3419
See application file for complete search history.

(56) References Cited

U.S. PATENT DOCUMENTS

| | | | |
|---|---|---|---|
| 6,061,692 A | * | 5/2000 | Thomas ............ G06F 17/30362 707/613 |
| 6,542,921 B1 | | 4/2003 | Sager |
| 8,127,303 B2 | | 2/2012 | Kukanov et al. |
| 8,185,895 B2 | | 5/2012 | Ko et al. |
| 8,196,147 B1 | | 6/2012 | Srinivasan et al. |

(Continued)

FOREIGN PATENT DOCUMENTS

GB        2492653        1/2013

OTHER PUBLICATIONS vanDooren; "Creating a thread safe producer consumer queue in C++ without using locks"; C++ Programming on Cloud 9, Jan. 5, 2007; blogs.msmvps.com/vandooren/2007/01/05/creating-a-thread-safe-producer-consumer-queue-in-c-without-using-locks/ on Sep. 3, 2015.

(Continued)

*Primary Examiner* — Michael Krofcheck
(74) *Attorney, Agent, or Firm* — Klein, O'Neill & Singh, LLP

(57) ABSTRACT

A system and method for of prioritizing accumulation of time-dependent data is disclosed. In an embodiment, a plurality of data elements are identified to be retrieved. The data elements include a high-priority data element and a low-priority data element. A first data retrieval operation is performed to retrieve the high-priority data element, to store a copy of the high-priority data element in a memory structure, and to reserve a memory space in the memory structure for the low-priority data element based on the low-priority data element corresponding to the high-priority data element. In parallel with the first data retrieval operation, a second data retrieval operation is performed to analyze the memory structure to detect the reserved memory space, upon detecting the reserved memory space, to retrieve the low-priority data element, and to store a copy of the low-priority data element in the reserved memory space.

20 Claims, 8 Drawing Sheets

(56) References Cited

U.S. PATENT DOCUMENTS

| | | |
|---|---|---|
| 8,234,250 B1 | 7/2012 | Sharma et al. |
| 8,245,207 B1 | 8/2012 | English et al. |
| 8,621,184 B1 | 12/2013 | Radhakrishnan et al. |
| 8,910,171 B2 | 12/2014 | Mital et al. |
| 8,954,986 B2 | 2/2015 | Rajagopalan et al. |
| 9,256,477 B2 | 2/2016 | Truong et al. |
| 2002/0199069 A1 | 12/2002 | Joseph |
| 2003/0140085 A1 | 7/2003 | Moir et al. |
| 2003/0233392 A1 | 12/2003 | Forin et al. |
| 2004/0154020 A1 | 8/2004 | Chen et al. |
| 2007/0169123 A1 | 7/2007 | Hopkins |
| 2008/0034190 A1 | 2/2008 | Rodgers et al. |
| 2008/0062927 A1 | 3/2008 | Zhu et al. |
| 2009/0172666 A1* | 7/2009 | Yahalom ............... G06F 3/0605 718/1 |
| 2010/0095305 A1 | 4/2010 | Akizuki |
| 2010/0100590 A1* | 4/2010 | Palay .................. G06Q 10/107 709/203 |
| 2010/0287019 A1* | 11/2010 | Guo .................... G06F 11/3442 709/224 |
| 2013/0191852 A1 | 7/2013 | Howes et al. |
| 2013/0198760 A1 | 8/2013 | Cuadra et al. |
| 2013/0247043 A1* | 9/2013 | Bingham ............ G06F 9/45533 718/1 |
| 2013/0305258 A1 | 11/2013 | Durant |
| 2014/0068232 A1 | 3/2014 | Wang et al. |
| 2014/0081906 A1* | 3/2014 | Geddam ............. H04L 67/1097 707/609 |
| 2014/0229953 A1 | 8/2014 | Sevastiyanov et al. |
| 2014/0237474 A1 | 8/2014 | Branton |
| 2015/0205646 A1 | 7/2015 | Singh |

OTHER PUBLICATIONS

Wikipedia; "Non-blocking algorithm"; http://en.wikipedia.org/wiki/Non-blocking_algorithm; May 21, 2014; 5 pages.

Wikipedia; "Timestamp-based concurrency control"; http://en.wikipedia.org/wiki/Timestamp-based_concurrency_control; May 21, 2014; 4 pages.

Non-Final Office Action on co-pending U.S. Appl. No. 14/290,763 dated Sep. 9, 2015.

Notice of Allowance on co-pending U.S. Appl. No. 14/290,763 dated Dec. 3, 2015.

\* cited by examiner

Figure 5

Kernel-Level Virtual Address Space 212

Memory Structure 502

| Counter ID 408 | Counter Value 410 | Storage Element ID 412 | Metric 414 |
|---|---|---|---|
| | | | |
| | | | |
| | | | |
| | | | |
| | | | |
| | | | |

First Data Portion 402

| Counter ID 408 | Counter Value 410 |
|---|---|
| 12A3F495 | 56 |
| 18C67B7A | 48 |
| 9BC76E82 | 35 |
| 784F193A | 02 |
| 8AB5347A | 94 |
| 75BAC945 | 75 |

Daemon-Level Virtual Address Space 214

Second Data Portion 404

| Counter ID 408 | Storage Element ID 412 |
|---|---|
| 12A3F495 | Drive A |
| 9BC76E82 | Drive A |
| 84F8985A | Drive A |

User-Level Virtual Address Space 216

Third Data Portion 406

| Counter ID 408 | Storage Element ID 412 | Metric 414 |
|---|---|---|
| 12A3F495 | | Concurr. Trans. |
| 9BC76E82 | | IOPS |
| 18C67B7A | Volume B | Concurr. Trans. |
| 784F193A | Drive C | IOPS |
| 8AB5347A | RAID Array D | Queue Depth |
| 75BAC945 | Volume E | Read Throughput |

200

Kernel-Level Virtual Address Space 212

Memory Structure 502

| Counter ID 408 | Counter Value 410 | Storage Element ID 412 | Metric 414 |
|---|---|---|---|
| 12A3F495 | 56 | Drive A | Conc Trans |
| 18C67B7A | 48 | | |
| 9BC76E82 | 35 | | |
| 784F193A | 02 | | |
| | | | |
| | | | |

First Data Portion 402

| Counter ID 408 | Counter Value 410 |
|---|---|
| 12A3F495 | 56 |
| 18C67B7A | 48 |
| 9BC76E82 | 35 |
| 784F193A | 02 |
| 8AB5347A | 94 |
| 75BAC945 | 75 |

Daemon-Level Virtual Address Space 214

Second Data Portion 404

| Counter ID 408 | Storage Element ID 412 |
|---|---|
| 12A3F495 | Drive A |
| 9BC76E82 | Drive A |
| 84F8985A | Drive A |

User-Level Virtual Address Space 216

Third Data Portion 406

| Counter ID 408 | Storage Element ID 412 | Metric 414 |
|---|---|---|
| 12A3F495 | | Concurr. Trans. |
| 9BC76E82 | | IOPS |
| 18C67B7A | Volume B | Concurr. Trans. |
| 784F193A | Drive C | IOPS |
| 8AB5347A | RAID Array D | Queue Depth |
| 75BAC945 | Volume E | Read Throughput |

Kernel-Level Virtual Address Space 212

First Data Portion 402

| Counter ID 408 | Counter Value 410 |
|---|---|
| 12A3F495 | 56 |
| 18C67B7A | 48 |
| 9BC76E82 | 35 |
| 784F193A | 02 |
| 8AB5347A | 94 |
| 75BAC945 | 75 |

Daemon-Level Virtual Address Space 214

Second Data Portion 404

| Counter ID 408 | Storage Element ID 412 |
|---|---|
| 12A3F495 | Drive A |
| 9BC76E82 | Drive A |
| 84F8985A | Drive A |

User-Level Virtual Address Space 216

Third Data Portion 406

| Counter ID 408 | Storage Element ID 412 | Metric 414 |
|---|---|---|
| 12A3F495 | | Concurr. Trans. |
| 9BC76E82 | | IOPS |
| 18C67B7A | Volume B | Concurr. Trans. |
| 784F193A | Drive C | IOPS |
| 8AB5347A | RAID Array D | Queue Depth |
| 75BAC945 | Volume E | Read Throughput |

Non-Volatile Storage Medium

Memory Structure 502

| Counter ID 408 | Counter Value 410 | Storage Element ID 412 | Metric 414 |
|---|---|---|---|
| 12A3F495 | 56 | Drive A | Conc Trans |
| 18C67B7A | 48 | Vol. B | Conc Trans |
| 9BC76E82 | 35 | Drive A | IOPS |
| 784F193A | 02 | Drive C | IOPS |
| 8AB5347A | 94 | RAID Array D | Q. Depth |
| 75BAC945 | 75 | Vol. E | Read Thpt |

Figure 8

SYSTEM AND METHOD FOR PARALLELIZED PERFORMANCE DATA COLLECTION IN A COMPUTING SYSTEM

TECHNICAL FIELD

The present disclosure relates generally to computing system data management and, more particularly, to a technique for accumulating and merging data originating from different processes with reduced overhead.

BACKGROUND

Networks and distributed storage allow data to be shared between devices located anywhere a connection is available. Improvements in capacity and network speeds have enabled a move away from locally attached storage devices and towards centralized storage repositories such as cloud-based data storage. These storage systems may be scalable and may range from a single shared folder to a cluster of file servers attached to and controlling racks of disk arrays. These centralized offerings are delivering the promised advantages of security, worldwide accessibility, and data redundancy. To provide these services, storage systems may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out a storage architecture to meet these expectations enables the next generation of applications, which is expected to bring even greater demand. NetApp storage systems offer NAS and SAN capabilities and support a wide range of standards.

To detect bottlenecks and overcapacity, conventional storage systems monitor and report performance data obtained from their various components. This performance data may be used for performance monitoring, optimization, planning, and troubleshooting. In one example system that includes a logical storage volume that stores data to a multitude of underlying physical storage devices, the performance of each storage device affects the overall performance of the logical storage volume. Accordingly, a storage controller coupled to the storage devices has a performance reporting function that samples performance data of the logical volume and archives (saves) the performance data and/or transmits it to one or more analytical programs. Archiving the data allows a-posteriori diagnostic of customer performance issues by support teams without having to artificially reproduce the event. When archiving performance data, the storage controller samples the performance data of the logical volume (including, among other things, performance data of the underlying physical storage drives) at preconfigured intervals triggered by a system clock, e.g., from once every second to once a week in the current embodiment.

The processing resources used to obtain and report the sampled performance data are considered overhead because they are temporarily unavailable to perform the primary functions of serving storage operations. As the number of tracked objects in a storage system increases, the amount of data sampled and transferred also increases, thereby increasing the amount of overhead. This means that as a storage system grows and more objects (including both tracked hardware components and tracked software components) are included in the system, the overhead of performance data collection grows, which may adversely impact the actual performance of the system. In an exemplary embodiment, a storage system tracks over 300 objects, each of which may in turn track up to hundreds of thousand instances. Longer term, object growth is expected to continue, making the current approach untenable.

Improvements that reduce system overhead, including the overhead of performance monitoring, free up resources to handle storage operations, thereby allowing the storage system to wring more performance from the same hardware. For these reasons and others, improved systems and techniques for performance monitoring are important to the next generation of information storage system.

BRIEF DESCRIPTION OF THE DRAWINGS

FIGS. 4-8 are diagrams of address spaces within a software environment of a computing system performing data accumulation according to some embodiments of the present disclosure.

DETAILED DESCRIPTION

Figure 1:
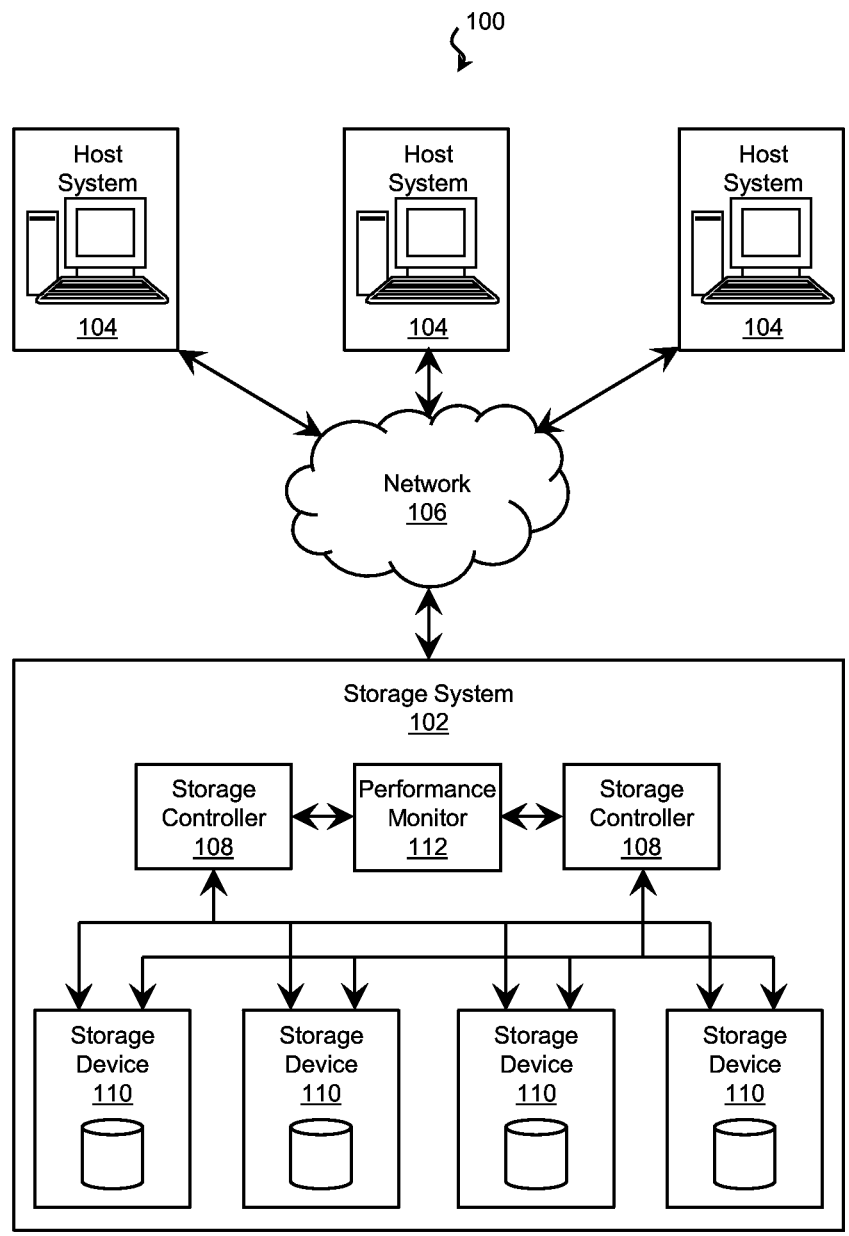
FIG. 1 is a schematic diagram of a network storage environment according to some embodiments of the present disclosure.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide a technique for accumulating data for archiving that prioritizes the collection of some data values to ensure prompt collection, while deprioritizing others to avoid delaying other tasks. The data being merged may include any suitable type and amount of data, and in an exemplary embodiment, the data includes performance metrics of a storage system that are recorded at specified intervals to track performance over time, and information on the origin of the performance data. The data to be accumulated is divided by priority, determined in part by the data's time dependency, the computational burden of collecting the data, the hierarchical level by which it is stored, and/or other suitable criteria. Higher-priority data is retrieved first and placed into a memory structure, such as a buffer, by a first set of process threads. In an exemplary embodiment, each thread in the first set has a corresponding buffer. A secondary set of parallel threads, running concurrently but scheduled less frequently, monitors the memory structure, retrieves corresponding lower-priority data, and inserts the data in the memory structure. The data recorded in the memory structure is then written to a storage device. By combining the high-priority data and low priority data, a full picture of the system can be stored and correlated, including human readable information of all the resources tracked. By reviewing changes in the data over time, an administrator can gauge how the system performs under load and where capacity should be added.

In an exemplary embodiment, the archival process includes a set of kernel threads. Within the kernel are a set of tracking counters that contain performance values (number of instructions performed, queue depth, throughput, latencies, resource usage counts, events counts and/or other performance metrics). The counter values are designated high priority because they are numerous and frequently changing, and their quick retrieval may be valuable for other reasons as well. One or more worker threads retrieve the high-priority data elements and place them into a memory structure (e.g., a buffer). Associated low-priority data that is less frequently changed and slower to retrieve is collected later. In the embodiment, the low-priority data includes data that puts the high-priority data in context, such as storage device identifiers, metric identifiers, system identifiers and other suitable data. One or more cleaner threads, which run concurrently with the worker threads, monitor the memory structures for an indicator requesting for a low-priority data element. In one example, the cleaner thread detects that a collected counter has a missing value not provided by a worker threads. The cleaner thread determines a method for how the missing value is determined (i.e., a translation function for the respective input counter). Based on the translation function, the cleaner thread retrieves the lower-priority data for the missing value and stores it in the memory structure. The cleaner thread may request this data in the background without interrupting the collection of the higher-priority data or other tasks by providing the translation function to a user space daemon which runs the translation function to return the missing lower-priority data to the kernel cleaner thread. To improve performance, such requests may be grouped to offset the latency of individual requests. In an exemplary storage system, the cleaner threads are not in the critical path of the data collection, and can cope with the latency of the operation.

Various embodiments provide one or more advantages over conventional systems. For instance, in some embodiments, this technique allows highly time-varying values to be retrieved more promptly by deprioritizing the collection of less variable values. In some embodiments where processing resources are shared between data accumulation tasks and other tasks, deprioritizing part of the data accumulation task may reduce the delays experienced by the other tasks and/or increase the quantity of performance data the system can support.

Distinguishing high-priority and low-priority data also allows the underlying data to be stored in different virtual address spaces having different access latency in some embodiments. For example, in some embodiments, high-priority data is stored within the kernel-level virtual address space in order to reduce latency, while low-priority data is stored at a higher-level address space having greater access latency. Locating low-priority data away from the kernel may avoid data duplication or increasing data management. However, low-priority data is generally not available in the kernel address space because it is not used internally. Nevertheless, the low-priority data may be important to the archival process because it allows users to interpret the performance data. Because collection of high-priority data and low-priority data may proceed in parallel and asynchronously, the low-priority data may be removed from the critical path. In addition, slower retrieval tasks can be batched, which may reduce total latency and reduce the burden on interface elements. It is understood that these advantages are merely exemplary, and no particular advantage or benefit is necessary or required for any particular embodiment.

Referring first to FIG. 1, illustrated is a schematic diagram of a network storage environment 100 according to some embodiments of the present disclosure. The network storage environment 100 includes a storage system 102 connected to one or more host systems 104 (sometimes referred to as clients) via a network 106. The storage system 102 receives data transactions from the host systems 104 and performs the data transactions on their behalf. The storage system 102 is merely one example of a computing system that performs a data archival process, the collection and storage of data, that is ancillary to the primary function of the system. It is understood that the principles and techniques described herein for collecting distributed data, while well-suited to aggregating performance data, apply equally to any other data accumulation tasks and, in that regard, may be applied to computing systems generally.

While the storage system 102 is referred to as a singular entity, it may include any number of computing devices and may range from a single computing system to a system cluster of any size. Accordingly, in the illustrated embodiment, the storage system 102 includes at least one computing system, which in turn includes one or more processors such as a microcontroller or a central processing unit (CPU) operable to perform various computing instructions. The computing system may also include any combination of memory devices such as random access memory (RAM); static RAM (SRAM) or Flash memory; a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

The storage system 102 includes one or more storage controllers 108 communicatively coupled to one or more storage devices 110. In various examples, the storage devices 110 include hard disk drives (HDDs), solid state drives (SSDs), optical drives, and/or any other suitable volatile or non-volatile data storage medium. It is understood that for clarity and ease of explanation, only a limited number of storage controllers 108 and storage devices 110 are illustrated, although the storage system 102 may include any number of storage devices 110 coupled to any number of storage controllers 108.

The storage controllers 108 exercise low-level control over the storage devices 110 in order to execute (perform) data transactions on behalf of the storage system 102 and may also perform data transactions on behalf of other computing systems such as network-attached host systems 104. The storage controllers 108 provide an interface for communicating with the storage devices 110, and in that regard, may conform to any suitable hardware and/or software protocol. In various embodiments, the storage controllers 104 include Serial Attached SCSI (SAS), SATA, iSCSI, InfiniBand, Fibre Channel, and/or Fibre Channel over Ethernet (FCoE) controllers. Other suitable protocols include eSATA, PATA, USB, FireWire, etc. The physical connection between the storage controllers 108 and the connected storage devices may depend in part on the communication protocol and may take the form of a direct connection (e.g., a single wire or other point-to-point connection), a networked connection, or any combination thereof. Thus, in some embodiments, a storage controller 108 is communicatively coupled to a storage device 110 over a network, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. For redundancy, a single storage device 110 may be coupled to more than one storage controller 108.

As discussed above, the storage system 102 may be connected to the host systems 104 over a network 106 such as a local area network (LAN), an Ethernet subnet, a PCI or PCIe subnet, a switched PCIe subnet, a wide area network (WAN), a metropolitan area network (MAN), the Internet, or the like. The storage system 102 receives various data transactions (e.g., data read commands, data write commands, etc.) from the host systems 104 via the network 106.

Host system 104 represents any connected computing device capable of issuing data transactions to the storage system 102. In an example, a host system 104 runs one or more applications (e.g., word processing, virtual machine, or database programs) that utilize the storage provided by the storage system 102. In response to a request by a running application, the host system 104 formats a data transaction and dispatches it to the storage system 102 to be executed.

In even a modest network storage environment 100 with a limited number of host systems 104, the ability of the storage system 102 to quickly execute data transactions has a measurable impact on the performance of the applications running on the host systems 104. Accordingly, in an embodiment, the storage system 102 includes one or more performance monitors 112 that collect and analyze performance data from storage devices 110, storage controllers 108, and/or other elements of the storage system 102, and/or of the host systems 104. In various exemplary embodiments, the performance data includes total completed transactions, throughput information, queue wait time, execution time, number of concurrent data transactions, other performance metrics, configuration data, and/or other data used to interpret the performance data. In some such embodiments, the performance monitor 112 periodically collects performance data from counters associated with the storage devices 110, storage controllers 108, and/or other elements of the storage system 102 or host systems 104 and stores the data for future reference. By tracking the changes in performance data over time, system administrators are able to assess demand, identify potential bottlenecks, determine when and what to upgrade, and recognize components likely to fail. By storing historical data, system administrator can also troubleshoot past performance problems.

To obtain accurate measurements, it is desirable to collect the performance data as quickly as possible because many of the values are highly time dependent (i.e., the values change frequently). Each data transaction may update multiple performance counters and may update them multiple times. Accordingly, performance data may change hundreds or even thousands of times per second. However, data collection may delay other operations such as serving data to host systems 104. This is because, while the performance monitor 112 may include discrete processing hardware, it may also be implemented as software executed by the main processor of the storage system 102. This brings the performance monitor 112 in contention with the other software of the storage system 102. In some embodiments, the performance monitor 112 may temporarily redirect computing resources away from data serving tasks. In these embodiments especially, the efficiency of the performance monitor 112 may have a measurable effect on overall storage system 102 performance.

Figure 2:
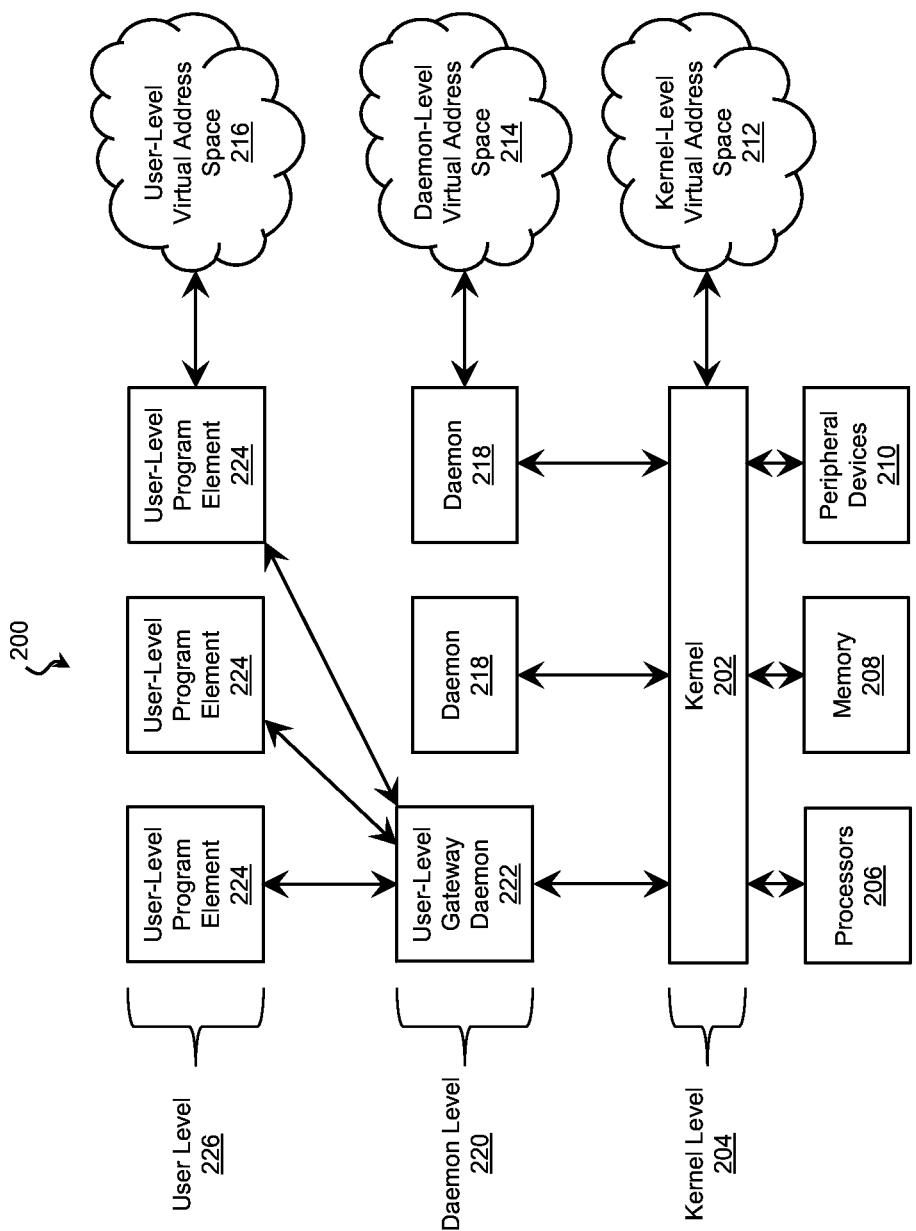
FIG. 2 is a schematic diagram of a software environment according to some embodiments of the present disclosure.

The operation of the performance monitor 112 of the storage system 102 will now be described from a software perspective. FIG. 2 is a schematic diagram of a software environment 200 according to some embodiments of the present disclosure. The software environment 200 represents the programming instructions running on the processing resources of the storage system 102 including the instructions of the performance monitor 112 used to collect and store performance data. The software environment 200 is described in the context of a storage system 102 but is equally characteristic of any computing system.

The software environment 200 includes one or more hierarchical levels of abstraction. Program elements can be understood as running at one or more of the hierarchical levels. To communicate between levels, program elements may communicate with each other according to standard protocols, often referred to as application programming interfaces (APIs). So long as the program elements comply with the API, they may remain agnostic to the inner workings of the other program elements and other hierarchical levels.

The kernel 202 runs at the lowest hierarchical level, often referred to as the kernel level 204. The kernel 202 initializes and runs the other program elements of the software environment 200. Additionally, the kernel 202 handles interactions with hardware, including the processors 206, memory 208, and/or peripheral devices 210. For example, the kernel may handle scheduling, the allocation of processing resources among program elements. The kernel 202 may also provide a virtual memory environment for itself and for the other program elements of the software environment 200 by receiving data access requests directed to a virtual address and redirecting the request to the appropriate memory device. Virtual memory address spaces are represented in FIG. 2 by clouded boxes, and may be associated with a respective hierarchical level (e.g., kernel-level address space 212, daemon-level address space 214, user-level address space 216, etc.) corresponding to the level of the program that requested the address space to be assigned. Although virtual memory address spaces are drawn separated from the memory 208, it is understood that data read from or written to a virtual memory space is redirected by the kernel 202 to a memory device of the memory 208. Suitable memory devices include RAM, the aforementioned storage devices 110, and/or memory-mapped peripheral devices. Accordingly, in an embodiment, the kernel 202 communicates with the storage devices 110 of the storage system 102 via the storage controllers 108.

In some embodiments, the majority of the performance monitor 112 tasks, such as updating performance data and storing the data for further reference, are performed by the kernel 202. In such embodiments, a portion of the performance monitor 112 is integrated into the kernel 202. This does not preclude other functions of the performance monitor 112 from being performed by other program elements running at other levels of the hierarchy. Accordingly, in some embodiments, performance data obtained by the kernel 202 is analyzed to detect long-term trends by a program element running at another level of the hierarchy or outside the storage system 102.

The kernel 202 also oversees the execution of these and other program elements running at the various level of hierarchy. For example, the kernel 202 may run one or more daemons 218 at the daemon level 220. In some embodiments, the daemon level 220 is considered part of the kernel level 204, although in other embodiments, a discrete daemon level 220 exists for running these program elements. A daemon 218 is a type of program element that runs in the background, meaning it typically does not request or receive user input. The kernel 202 may run a daemon 218 to handle various tasks, such as data logging, tracking configuration data, or handling communications to a user console or APIs for other systems to interface to the storage system 102. A particular type of daemon, gateway daemons (e.g., user-level gateway daemon 222) handle data transactions between hierarchical levels. Accordingly, in the illustrated embodiment, user-level gateway daemon 222 exchanges data between the kernel 202 and the user-level program elements 224 running at the user level 226.

Figure 3:
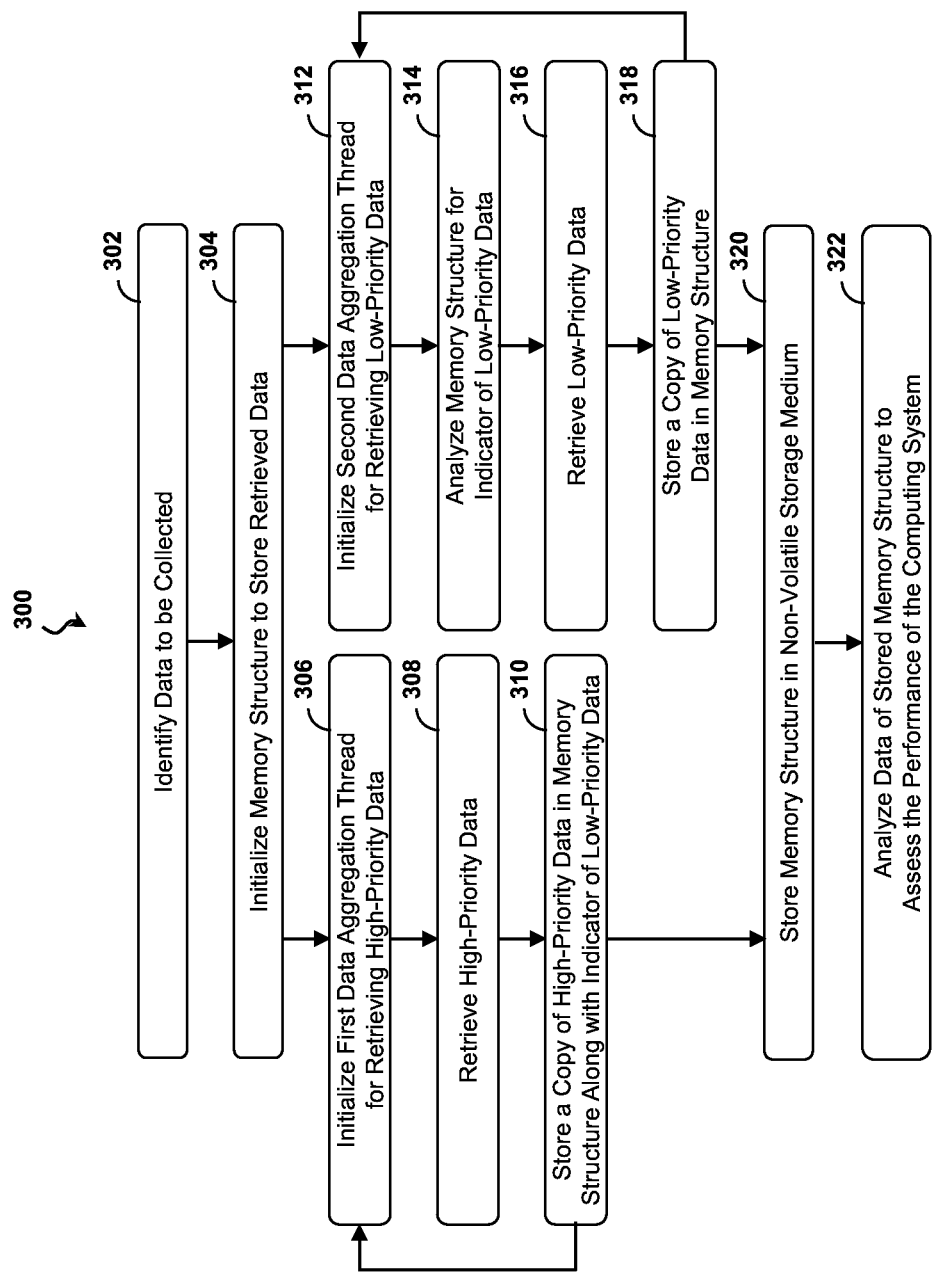
FIG. 3 is a flow diagram of a method of data accumulation according to some embodiments of the present disclosure.

In contrast to daemons 218, user-level program elements 224 commonly respond to user input and are considered to run in the foreground. These program elements are often directly visible to the users. Applications (e.g., word processing applications, database applications, programming applications, etc.) are groups of one or more programming elements, the bulk of which are run at the user level 226. The user level 226 is often a multi-tiered construct that includes further hierarchal levels, each with its own associated access permissions. As will be described in more detail below, by distributing data appropriately throughout the hierarchy of the software environment 200, the collection of the most critical data may be expedited, while less time-sensitive may be pushed up to higher levels of the hierarchy. be retrieved first, A technique for data accumulation across the levels the software environment 200 of FIG. 2 will now be described with reference to FIGS. 3-8. When used to accumulate performance data, the technique may include storing accumulated performance metrics for a particular interval and comparing the metrics over a set of intervals to detect trends in system performance. FIG. 3 is a flow diagram of a method 300 of data accumulation according to some embodiments of the present disclosure. It is understood that additional steps can be provided before, during, and after the steps of method 300, and that some of the steps described can be replaced or eliminated for other embodiments of the method 300. FIGS. 4-8 are diagrams of address spaces within a software environment 200 of a computing system performing data accumulation according to some embodiments of the present disclosure. As described above, the address spaces map to physical addresses within a volatile (e.g., RAM) or non-volatile (e.g., storage device 110) storage element of the computing system.

The method 300 for data collection and accumulation may be performed in response to any suitable trigger. For example, in some embodiments, the method 300 is performed at a set time or at a set interval. In some embodiments, the method 300 is performed based on a user request. In some embodiments, the method 300 is performed based on data exceeding a predefined threshold. For example, the method 300 may collect data from a buffer when the buffer indicates that it is full. In some embodiments, the method 300 is performed based on combinations of these triggers and others.

Figure 4:
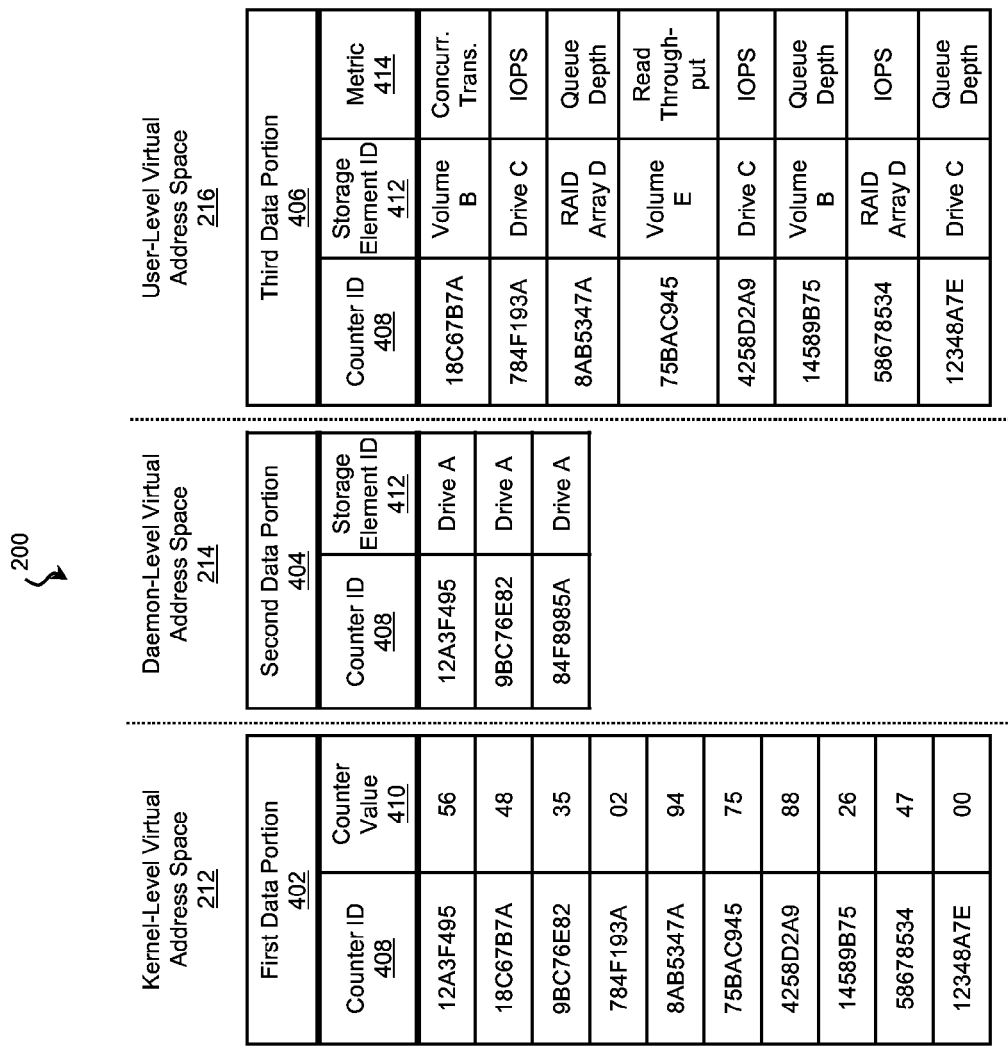

Referring to block 302 of FIG. 3 and to FIG. 4, upon detecting a triggering event, the computing system identifies data to be collected. In the illustrated embodiment, the data to be collected includes performance metrics representing the performance of a storage system 102, and the performance monitor 112 determines a subset of the performance metrics to be collected for a particular interval. For example, the performance metrics may include values tracked by work-based counters. In some exemplary embodiments, the storage system 102 includes at least one work-based counter for each performance aspect (e.g., completed data transactions, throughput information, queue wait time, execution time, number of concurrent data transactions, etc.) of each respective storage entity (e.g., storage volume, storage device, storage drive accumulates, node, etc.). The counters are incremented as work is performed by their corresponding storage entities. It is understood that this is merely one example of a possible type of data. In further embodiments, the data to be collected includes any and all other suitable types of data.

Referring to FIG. 4, elements of the performance data are stored in one or more different address spaces within the software environment 200 of the computing system. The method 300 is operable to accumulate data across these disparate address spaces. In the illustrated embodiment, a first portion 402 of the data is stored within the kernel-level address space 212; a second portion 404 of the data is stored within the daemon-level address space 214; and a third portion 406 of the data is stored within the user-level address space 216. Data of any type may be stored within any address space, and the data stored by one address space may be related to data stored in another.

In an exemplary embodiment, the first portion 402 of the data includes performance values, such as counter values. These counter values may be stored in any suitable format including a linked list, a tree, a table such as a hash table, an associative array, a state table, a flat file, a relational database, and/or other memory structure. In the illustrated embodiment, the data elements of the first portion 402 each include a counter ID 408 paired with a counter value 410. There are advantages to storing at least the counter values 410 within the kernel-level address space 212. For example, kernel-level counter values may be updated quicker because inter-level communications are avoided, and kernel-level counter values may allow performance monitoring tasks to be run in the kernel 202 to take advantage of the kernel's higher execution priority.

Continuing with the illustrated embodiment, the second portion 404 and/or third portion 406 includes data related to that of the first portion 402. For example, data within the second portion 404 and/or third portion 406 may identify which storage element a counter is monitoring, what system or subsystem contains the storage element, what aspect of performance a counter measures, what host or host groups a counter is monitoring, and/or other suitable aspects of performance. In contrast to the counter values 410 and other data within the first portion 402, data elements within the second portion 404 and/or third portion 406 may be updated less frequently (e.g., once a second or less).

Data within the second portion 404 and/or third portion 406 may be stored in any suitable format including a linked list, a tree, a table such as a hash table, an associative array, a state table, a flat file, a relational database, and/or other memory structure. In the illustrated embodiment, some data elements of the second portion 404 and third portion 406 include a counter ID 408 paired with a corresponding storage element ID 412, and some elements include a counter ID 408 paired with a corresponding performance metric 414. It is understood that the illustrated data types are merely exemplary.

Referring still to block 302 of FIG. 3, the computing system may identify high-priority data elements and/or low-priority data elements within the set of data to be collected. In many embodiments, an administrator and/or system designer determines the appropriate category for a data element based on its behavior. However, in some embodiments, the computing system determines which data elements are high priority and low priority based on a set of heuristics. In various examples, data elements are labeled high priority based on their time-dependent nature, based on the computational burden of collecting the data, based on their respective level within the hierarchy, and/or other suitable criteria. For example, counter values 410 are often updated several orders of magnitude more often than other data elements, and therefore may be designated high priority. In some embodiments, because data elements stored within the kernel-level address space 212 can be retrieved fastest, they are designated high priority, whereas data elements stored within other address spaces are designated low priority because of the latency involved in retrieving the data. Information regarding the high-priority and low-priority designations may be stored in a preset file.

Referring to block 304 of FIG. 3 and to FIG. 5, the kernel 202 initializes a memory structure 502 within the kernel-level address space 212 to hold the collected data. The memory structure 502 may take any suitable format including a linked list, a tree, a table such as a hash table, an associative array, a state table, a flat file, a relational database, and/or other memory structure. In an embodiment, structure 502 is a buffer that stores counter values at known offsets based on the ordering of the counters and their sizes.

Referring to block 306 of FIG. 3, the kernel 202 initializes a first accumulation thread, sometimes referred to as a worker thread. A thread in this example includes a sequence of logical instructions. Referring to block 308, the first accumulation thread retrieves the data elements designated as high priority and creates a copy of the data in the memory structure 502. In the illustrated embodiment, the counter values 410 within the first portion 402 are designated high priority and are retrieved by the first accumulation thread.

In embodiments in which some data is stored in address spaces other than the kernel-level address space 212, the kernel 202 may request the data from the respective owner, such as daemons 218 running at the daemon level 220 and/or program elements 224 running at the user level 226. For example, while the kernel 202 may store data addressed to the user-level address space 216 on behalf of the user-level program elements 224, the kernel 202 may not understand the significance of the data being stored. Accordingly, to retrieve a particular data element, the kernel 202 may request the element from the respective user-level program element 224 rather than retrieving it from memory 208 directly.

The request for data from other virtual address spaces may be made directly or through an intermediary. In one such embodiment, a user-level gateway daemon 222 handles interactions between the first accumulation thread running in the kernel 202 and the program elements 224 at the user level 226. The gateway daemon 222 receives requests for data from the kernel 202 and generates a corresponding request in a protocol understood by the respective user-level program element 224. For example, in some embodiments, a Remote Procedure Call (RPC) protocol, typically used to request data between user-level program elements 224 running on different systems, is repurposed by kernel 202 and the gateway daemon 222 to exchange data. RPC protocols are common and well documented, and the user-level program elements 224 may already support RPC commands without further modification.

Figure 6:
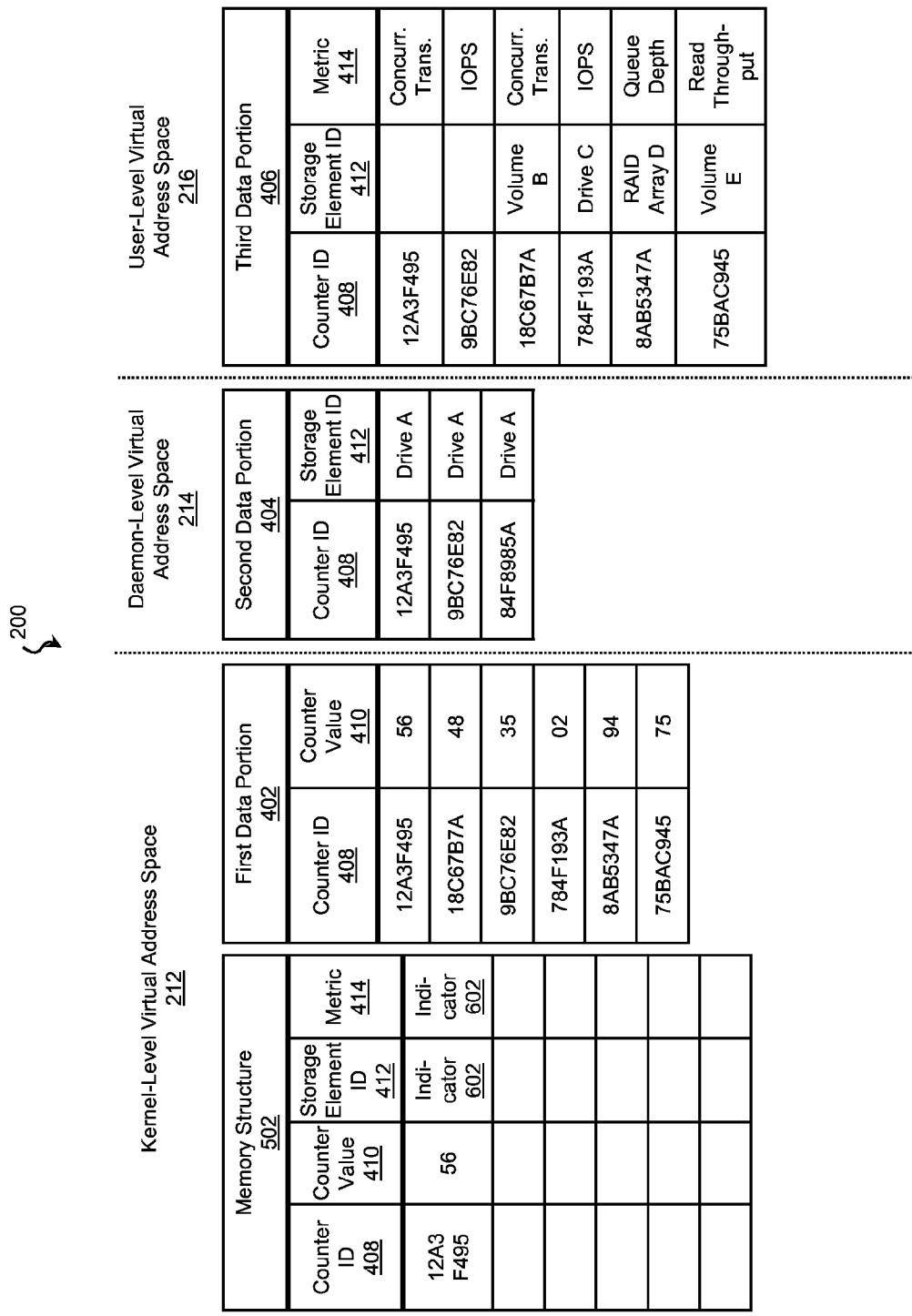

Referring to block 310 of FIG. 3 and to FIG. 6, once retrieved, the first accumulation thread stores a copy of the high-priority data element within the memory structure 502. The first accumulation thread may also store an indicator 602 of any associated low-priority data element within the memory structure. In an example the first accumulation thread creates a reserved area in memory within the memory structure 502 for the corresponding low-priority data element. The first accumulation thread repeats the process of blocks 306-310 until all the high-priority data elements have been retrieved and stored. In on such embodiment, the memory structure 502 includes a buffer used to collect the data. Within the buffer, space is reserved to hold the data. The high-priority data counters are collected first, leaving room in the buffer for the low-priority data counters, which may be interspersed between the high priority counters. Before the buffer is stored to disk, the missing low-priority data retrieved and filled in as described in more detail below. In brief, a low priority data thread scans the counter configuration for this buffer entry and detects the address of the low-priority data. It then requests the low priority data from a daemon via an RPC.

Referring to block 312, the kernel initializes a second accumulation thread, sometimes referred to as a cleaner thread. The second accumulation thread may be run in parallel to and concurrently with the first accumulation thread, such that during some period of time both threads are running. The kernel 202 may assign the second accumulation thread a lower execution priority than the first accumulation thread. Referring to block 314, the second accumulation thread analyzes the memory structure 502 for indicators 602 signifying low-priority data to be retrieved. For example, the second accumulation thread may detect reserved memory areas set aside by the first accumulation thread. In many embodiments, the second accumulation thread selectively retrieves only the low-priority data that corresponds to the high-priority data being collected (e.g., retrieving only those storage entity identifiers that correspond to the counter values currently being collected). This may reduce the number of requests for irrelevant data or unused data. Additionally or in the alternative, the second accumulation thread may identify the low-priority data to retrieve based on the preset file of block 302.

Referring to block 316, the second accumulation thread retrieves the low-priority data from a respective address space. In embodiments in which low-priority data is stored within the kernel-level address space 212, the kernel 202 may retrieve it directly. In embodiments in which low-priority data is stored in other address spaces, the kernel 202 requests the data from the respective owner, such as daemons 218 running at the daemon level 220 and/or program elements 224 running at the user level 226. In one such embodiment, the kernel 202 requests the data from a daemon 218 by providing the daemon 218 an RPC request for the data. Similar to the process describe above, the request may be made directly or through an intermediary. In one such embodiment, a user-level gateway daemon 222 handles interactions between the first accumulation thread running in the kernel 202 and the program elements 224 at the user level 226. The gateway daemon 222 receives requests from data from the kernel 202 and generates a corresponding request in a protocol understood by the respective user-level program element 224. For example, the user-level gateway daemon 222 may provide RPC requests for the data to the user-level program elements 224 on behalf of the kernel 202. To reduce the number of inter-level requests, data requests may be grouped into a batch, a single request for multiple data elements, by the kernel 202 and/or the gateway daemon 222.

Referring to block 318 of FIG. 3 and to FIG. 7, the second accumulation thread stores a copy of the retrieved low-priority data element in the memory structure 502. As can be seen, the first accumulation thread has continued to run and, in the illustrated embodiment, has written subsequent high-priority data elements to the memory structure 502 in the interim. The second accumulation thread repeats the process of blocks 312-318 until all the low-priority data elements have been retrieved and stored.

Referring to block 320 of FIG. 3 and to FIG. 8, once both threads have update the memory structure 502, the kernel 202 stores the memory structure 502, including the high-priority data elements and the low-priority data elements in a non-volatile storage medium such as one or more of the aforementioned storage devices 110. In the example where the memory structure 502 includes performance data accumulated over an interval of time, the stored memory data is compared with other performance data accumulated over other intervals. By tracking the changes in performance data over time, system administrators are able to assess demand, identify potential bottlenecks and performance-limiting components, determine when and what to upgrade, recognize components likely to fail, and/or make other assessments of the computing system as shown in block 322. For example, if a buffer utilization is unacceptably high but it is only an isolated occurrence, it may indicate a one-time spike in demand. In contrast, if the buffer utilization remains consistently high, it may indicate that the storage system should be upgraded to better handle the load. In another example, if storage device utilization remains below a threshold for a certain number of intervals, it may indicate that the respective data volume could be moved to a slower storage device. In an embodiment, the high priority data is collected into a buffer. The buffer is then checked by the low-priority data thread for low-priority counters to update, and if there are some, gets the counters and stores them into the buffer. Once this is done, the buffer is complete and the low-priority thread proceeds to commit the data to a file on disk.

There are a number of advantages to dividing the data elements into high-priority and low-priority categories. For example, as discussed above, data elements such as performance metrics may be time varying. In the time it takes to retrieve data from a given counter, the next subsequent counter may have updated. By identifying and separating time-critical data, these high-priority data elements may be retrieved more rapidly. In addition, separating high-priority and low-priority data allows high-priority data to be stored at a level of hierarchy closer to the kernel 202. This may improve the retrieval time of the high-priority data. Likewise, shifting low-priority data to higher levels of the hierarchy may free up kernel 202 resources for other time-dependent tasks.

In an embodiment, the low-priority data includes configuration information such as labels describing different parts of the system, such as names of storage volumes, or location IDs of hardware. In the embodiment, the data is stored at the daemon level 220, and may be requested outside of the archival process. For example, when a user requests information about a part of the system, a numerical ID is passed to the kernel when the data is in the kernel, and on retrieval, the ID is matched to a textual description. Similarly, when archiving kernel counters, the names of the parts of the system are considered to be low-priority data available outside of the kernel, and requested via RPC to the daemon holding them. The request may be made using the numerical ID of the part of the system to identify. This solution allows the kernel to archive information on the performance of the system that is fully self-contained.

Furthermore, this division allows the first accumulation thread, the more time-critical of the two, to be run more frequently or run at a higher priority level than the second accumulation thread. It may also allow the first accumulation thread to collect more data in an allotted run time. Performance data accumulation is often ancillary to the functioning of the computing system. For example, in a storage system 102, performance monitoring is ancillary to servicing data transactions, and may even be an impediment. By assigning the first accumulation thread a priority that is greater than, for example, servicing data transactions, and assigning the second accumulation thread a priority that is less than servicing data transactions, the data transactions are only pre-empted by the most critical portion of method 300.

In some embodiments, requesting and exchanging data between hierarchical levels is slower than intra-level exchanges by an order of magnitude or more. By designating data within user-level address spaces 216 as low priority, these exchanges can be performed in parallel with the retrieving of the high-priority data. This takes the inter-level exchanges out of the critical path. In addition, these inter-level exchanges can be batched to increase bandwidth, which may reduce total latency cost per counter and reduce the burden on interface elements such as the gateway daemon 222. It is understood that these advantages are merely exemplary, and no particular advantage or benefit is necessary or required for any particular embodiment.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors of the storage system 102 execute code to implement the actions described above.

Accordingly, a system and method for collecting and aggregating data is provided. In some exemplary embodiments, the method of prioritizing accumulation of time-dependent data includes identifying a plurality of data elements to be retrieved that includes a high-priority data element and a low-priority data element. A first data retrieval operation is performed that includes: retrieving the high-priority data element; storing a copy of the high-priority data element in a memory structure; and reserving a memory space in the memory structure for the low-priority data element based on the low-priority data element corresponding to the high-priority data element. In parallel with the first data retrieval operation, a second data retrieval operation is performed that includes: analyzing the memory structure to detect the reserved memory space; upon detecting the reserved memory space, retrieving the low-priority data element; and storing a copy of the low-priority data element in the reserved memory space. In one such embodiment, the low-priority data element is retrieved from a user-level virtual address space, which may include providing a Remote Procedure Call (RPC) request for the low-priority data element to a user-level program element.

In further exemplary embodiments, the data management method includes performing a first logical sequence, that in turn includes retrieving a plurality of data elements, and storing the plurality of data elements in a memory structure. The data management method further includes performing a second logical sequence concurrent with the first, where the second logical sequence includes monitoring the memory structure to identify a related data element corresponding to at least one element of the plurality of data elements, retrieving the related data element, and storing the related data element in the memory structure. In one such embodiment, the plurality of data elements include a performance metric associated with a storage element, and the related data element includes at least one of: an identifier of the storage element and an identifier of the performance metric.

In yet further exemplary embodiments, the apparatus comprises a non-transitory, tangible computer readable storage medium storing a computer program. The computer program has instructions that, when executed by a computer processor, carry out: identifying a first data element based on at least one of time-dependency, an access time, and a corresponding hierarchical level; performing a first sequence including: retrieving the first data element; storing a copy of the first data element in a memory structure; and storing an indicator in the memory structure, wherein the indicator indicates a second data element associated with the first data element; performing a second sequence in parallel with the first sequence, wherein the second sequence includes: analyzing the memory structure to detect the indicator of the second data element; retrieving the second data element; and storing a copy of the second data element in the memory structure.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of prioritizing accumulation of time-dependent data performed by a computing system, the method comprising:
   identifying a plurality of data elements to be retrieved, wherein the plurality of data elements includes a high-priority data element and a low-priority data element;
   performing a first data retrieval operation, wherein the first data retrieval operation includes:
      retrieving the high-priority data element; and
      storing a copy of the high-priority data element in a memory structure; and
   performing a second data retrieval operation, wherein the second data retrieval operation is performed in parallel with the first data retrieval operation, and wherein the second data retrieval operation includes:
      identifying the low-priority data based on the memory structure;
      retrieving the low-priority data element; and
      storing a copy of the low-priority data element in the memory structure.

2. The method of claim 1,
   wherein the first data retrieval operation further includes reserving a memory space in the memory structure for the low-priority data element based on the low-priority data element corresponding to the high-priority data element, and
   wherein the second data retrieval operation further includes identifying the low priority data based on the reserved memory space and storing the copy of the low-priority data element in the reserved memory space.

3. The method of claim 1, wherein the high-priority data element includes a performance metric of a storage element, and wherein the low-priority data element includes an identifier of the storage element.

4. The method of claim 1, wherein the high-priority data element includes a performance metric of a storage element, and wherein the low-priority data element includes an identifier of the performance metric.

5. The method of claim 1, wherein the high-priority data element is identified as high-priority based on at least one of time-dependency, an access time, and a corresponding hierarchical level.

6. The method of claim 1, wherein the retrieving of the low-priority data element includes retrieving the low-priority data element from a daemon-level virtual address space.

7. The method of claim 6, wherein the retrieving of the low-priority data element includes constructing a batch request for the low-priority data element and at least one other data element.

8. The method of claim 6, wherein the retrieving of the low-priority data element includes providing a Remote Procedure Call (RPC) request for the low-priority data element to a daemon-level program element.

9. The method of claim 1 further comprising storing the memory structure including the high-priority data element and the low-priority data element in a non-volatile storage medium, and analyzing the stored memory structure to determine a performance-limiting component of the computing system.

10. A data management method, the method comprising:
    performing a first logical sequence, the first logical sequence including:
       retrieving a plurality of data elements; and
       storing the plurality of data elements in a memory structure; and
    performing a second logical sequence concurrent with the performing of the first logical sequence, the second logical sequence including:
       monitoring the memory structure to identify a related data element corresponding to at least one element of the plurality of data elements;
       retrieving the related data element; and
       storing the related data element in the memory structure.

11. The data management method of claim 10, wherein the plurality of data elements include a performance metric associated with a storage element, and wherein the related data element includes at least one of: an identifier of the storage element, and an identifier of the performance metric.

12. The data management method of claim 10 further comprising storing the memory structure including the plurality of data elements and the related data element in a non-volatile storage medium, and analyzing the stored memory structure to determine a performance-limiting component of a computing system.

13. The data management method of claim 10, wherein the retrieving of the related data element includes retrieving the related data element from a daemon-level address space.

14. The data management method of claim 13, wherein the retrieving of the related data element includes providing a Remote Procedure Call (RPC) request for the related data element to a daemon-level program element.

15. The data management method of claim 13, wherein the retrieving of the related data element includes constructing a batch request for the related data element and at least one other data element.

16. An apparatus comprising: a non-transitory, tangible computer readable storage medium storing a computer program, wherein the computer program has instructions that, when executed by a computer processor, carry out:
    identifying a first data element based on at least one of time-dependency, an access time, and a corresponding hierarchical level;

performing a first sequence including:
  retrieving the first data element;
  storing a copy of the first data element in a memory structure; and
  storing an indicator in the memory structure, wherein the indicator indicates a second data element associated with the first data element;
performing a second sequence in parallel with the first sequence, wherein the second sequence includes:
  analyzing the memory structure to detect the indicator of the second data element;
  retrieving the second data element; and
  storing a copy of the second data element in the memory structure.

17. The apparatus of claim 16, wherein the computer program has further instructions that carry out writing to a non-transitory storage medium the memory structure containing the copy of the first data element and the copy of the second data element.

18. The apparatus of claim 17, wherein the computer program has further instructions that carry out analyzing the stored memory structure to determine a performance-limiting component of a computing system.

19. The apparatus of claim 16, wherein the instructions that carry out the retrieving of the second data element retrieve the second data element from a daemon-level address space.

20. The apparatus of claim 19, wherein the computer program has further instructions that carry out combining a request for the second data element with a request for a third data element from the user-level address space.

* * * * *